3,809,658
PROCESS FOR THE PREPARATION OF RANEY-
METAL CATALYSTS HAVING HIGH ACTIVITY
Zoltán Csürös and József Petró, Budapest, Hungary, assignors to Magyar Tudomanyos Akademia, Budapest, Hungary
No Drawing. Filed Feb. 14, 1972, Ser. No. 226,302
Claims priority, application Hungary, Feb. 26, 1971, MA–2,199
Int. Cl. B01j 11/22
U.S. Cl. 252—472    3 Claims

ABSTRACT OF THE DISCLOSURE

Raney-catalysts of high activity are prepared by subjecting the alloys to decomposition prior to the conventional leaching operations. In the decomposition step the alloys are mixed with 0.1 to 1.8-fold amounts of an alkaline solution or water at a temperature of 20° C. to 150° C., preferably at 50° C. to 130° C., and the mixture is kept at a constant mass.

---

This invention relates to a process for the preparation of highly active Raney-metal catalysts.

It is known that Raney-type-metal catalysts are prepared from alloys containing one or more catalytically active metals (e.g., Ni, Co, Fe, Cu, Pd, etc.) and one or more catalytically inactive, easily dissolvable metals (e.g., Al, Si, Mg, Zn). The catalytically active metal component of the alloy is present in a so-called "dissolved" state, i.e. in a finely divided form. The inactive component is removed from the alloy by leaching the same with a solvent which does not attack the active metal. As solvents, generally aqueous alkaline solutions are used. During this procedure the active metal remains in the form of finely divided catalyst. The activity of the thus-obtained catalysts is higher than that of catalysts prepared, e.g., by reducing the appropriate metal oxides. This high activity explains the importance and the wide-spread use of such catalysts.

Raney-metal catalysts have been first disclosed in U.S. Pat. No. 1,628,190.

Leaching of the inactive components from the ready-made alloys containing generally about 50% of active metal and about 50% of inactive component is usually carried out in a two-step operation (Schröter, R.: Neuere Methoden de präparativen organischen Chemie, Verlag Chemie GmbH, Berlin, 1943, p. 78; Csürös, Z, Petró, J. and Vörös, J.: MTA Kém. Tud. Oszt. Közl. 9, 433/1957). The individual steps are:

(1) Initial leaching, and
(2) Final leaching.

The initial leaching step is generally carried out as follows: the alloy is added in several portions into a four-fold amount of a 15 to 25% by weight alkaline solution (due to the exothermic reaction and the vigorous gas evolution, this addition is generally carried out slowly), whereafter the mixture is heated until the hydrogen evolution ceases. The ratios of alloy:solution and alloy:alkaline agent, used in this step according to the known methods (Katalysatoren nach Raney, Merkblatt, Degussa, 1967, p. 7) are listed in the following table. The numerical data relate to 1 part by weight of alloy.

TABLE 1

| | Solution:alloy ratio | Al:NaOH molar ratio |
|---|---|---|
| Concentration of NaOH solution, percent by weight: | | |
| 13 | 12 | 1.9:1. |
| 18.6 | 4.5 | 1.1:1. |
| 20 | 4 to 5 | 1.0 to 1.2:1. |
| 25 | 4 | 1.3:1. |

At the end of the initial leaching step, the solution is decanted, a fresh alkaline solution is added to the alloy generally in an amount equal to that used in the first step, and leaching is finished by heating the reaction mixture.

The above-described method is widely used also today so that such prescriptions can be found even in up-to-date industrial and commercial prospectuses (Katalysatoren nach Raney, Merkblatt, Gegussa/1967/p. 7; Die Wirksamkeit spezieller Raney-Nickel Katalysatoren mit definierten Eigenschaften für chemische Reaktionen. Informationen, DODUCO, 1967, p. 2).

The catalytic properties of a catalyst prepared from a special alloy are essentially influenced by the conditions of the alkaline leaching steps described above. When, e.g., nickel-aluminum alloys are subjected to leaching, the crystal structure of the alloy rearranges. The manner and degree of this rearrangement changes with time and temperature of leaching, as well as with the amount of the alkaline substance used in the operation (Wagner, H., Schwab, G. and Stolger, I.: Z. phys. Chem. B. 27, 439/1934). Accordingly, the conditions of leaching have an essential influence on the catalytic properties of the obtained substances.

Several methods have been elaborated and put into practice in this field. These known methods are each characterized in that in the first step the alkaline solution is used in at least three- to four-fold amounts related to the weight of the alloy (in some instances 8 to 12 fold amounts of alkaline solution are required).

The object of the invention is to ensure an improved process for preparing highly active Raney-catalysts which are more disperse and more active than the known ones, starting from alloys of the same composition and dispersity as in the case of the known processes.

The invention is based on the recognition that if prior to the usual leaching the alloy is decomposed with a small amount of water or a dilute alkaline solution, then the catalytically active metal is obtained in a more disperse and more active form than in the case of the conventional operations.

Accordingly, this invention relates to a process for the preparation of highly active Raney-catalysts containing the active metal in finely dispersed state, by leaching the alkaline-soluble components from the alloy, in which prior to the leaching operation the powdery alloy is mixed at a temperature of 20 to 150° C., preferably at 50 to 130° C., with 0.1 to 1.8-fold amounts, calculated on the weight of the alloy, of water or an aqueous or inert organic solution containing an alkali metal or alkaline earth metal hydroxide and/or carbonate and/or ammonium hydroxide and/or ammonium carbonate in an amount of 0.001 to 0.8 times of the stoichiometric quantity, preferably 0.01 to 0.4 times of the stoichiometric quantity, related to the amount of the metal to be leached, and the alkaline agent used for leaching is added to the thus-obtained decomposed mass-like alloy.

When an inert organic solution is used, the organic solvent should be inert against the catalytically active metal and able to dissolve the required amount of the alkaline agent.

Depending on the particle size of the powdery alloy and on the nature of the metal to be dissolved (e.g., Al, Si, Mg, Zn or the mixtures thereof), after the mixing step the powdery alloy decomposes spontaneously in an exothermic reaction, or the reaction mixture is to be heated. In this step the major portion of the catalytically active metal (e.g., of Ni, Co, Cu, Fe, Pd, etc.) is released in an extremely finely divided form, while the metals to be dissolved are converted into their hydroxides. The amount of the alkaline agent can be catalytic or more but anyway lower than stoichiometric.

The decomposition of the powdery alloy is accompanied by vigorous gas evolution. At the end of the gas evolution the catalyst is already active, but in order to render more complete the dissolution of the alkaline-soluble component the mass is put into an aqueous alkaline solution and the hydroxides of the inactive metals are dissolved as in the conventional leaching operations, preferably by heating the mixture for a predetermined period, or without heating the mixture. Thereafter the obtained catalyst is washed until neutral.

Depending on the nature of the metals to be dissolved, the process according to the invention is preferably carried out as follows:

If the metal to be dissolved is aluminum, 1 part by weight of powdery alloy is mixed with 0.25 part by weight of a 5% by weight NaOH solution. The obtained mass can easily be stirred. An exothermic reaction, accompanied with gas and vapor evolution, sets in and the temperature of the mass rises to 90 to 100° C. During this operation water is added to the mixture to replace the evaporated water at such a rate that the mixture always has a constant mass. The NaOH solution may be replaced in this step by KOH solution or by a solution of another alkaline agent.

When the exothermic reaction ceases, i.e., when the temperature of the mixture decreases, 5 parts by weight of a 25% by weight NaOH solution are added to the mixture, and the mixture is heated at 90 to 100° C. for 30 minutes. The solvent is decanted, thereafter 4 parts by weight (calculated on the weight of the starting alloy) of a 25% by weight NaOH solution are poured onto the mass, and the mixture is heated for a further hour. Thereafter the alkaline solution is decanted and the obtained catalyst having spongy structure and excellent sedimenting properties is washed until neutral.

If the metal to be dissolved is silicon, 1 part by weight of the powdery alloy is mixed with 0.3 part by weight of 5% by weight NaOH solution, thereafter the obtained mass is heated. When the temperature of the mass reaches 80 to 90° C., an exothermic reaction accompanied by gas and vapor evolutions sets in, and the temperature of the mixture remains between 90° C. and 100° C. During this operation water is added to the mixture to replace the evaporated water at such a rate that the mixture always has a constant mass. The NaOH solution may be replaced in this operation by KOH solution or by a solution of another alkaline agent.

When the exothermic reaction ceases, i.e., when the temperature decreases, 4 parts by weight (calculated on the amount of the starting alloy) of a 30% by weight NaOH solution are added, and the mixture is heated at 100° C. to 110° C. for 30 minutes. The solution is decanted and 3 parts by weight (calculated on the weight of the starting alloy) of a 30% by weight NaOH solution are poured onto the mass. The mixture is heated at 100° C. to 110° C. for a further hour. Thereafter the alkaline solution is decanted and the obtained catalyst having spongy structure and excellent sedimenting properties is washed until neutral.

If the metal to be dissolved is magnesium, 1 part by weight of the powdery alloy is mixed with 0.5 part by weight of water. The obtained mass can easily be stirred. An exothermic reaction, accompanied by gas and vapor evolution, sets in and the temperature of the mixture rises to 90 to 100° C. During this operation water is added to the mixture to replace the evaporated water at such a rate that the mixture always has a constant mass. An alkaline solution may also be used for the decomposition but in this case a more exothermic reaction takes place.

When the exothermic reaction ceases, i.e., when the temperature of the mass decreases, 5 parts by weight (calculated on the amount of the starting alloy) of a 40% by weight NaOH solution are added, and the mixture is heated at 100 to 110° C. for 20 minutes. The mixture is diluted with water to about ten fold of its original volume, whereafter the solution containing the corresponding hydroxides is decanted, then 4 parts by weight (calculated on the amount of the starting alloy) of a 30% by weight NaOH solution are added to the residue and the mixture is heated at 100 to 110° C. for 30 minutes. Thereafter the alkaline solution is decanted and the obtained catalyst having spongy structure and excellent sedimenting properties is washed until neutral.

If the metal to be dissolved is zinc, 1 part by weight of powdery alloy is mixed with 0.15 part by weight of a 5% by weight NaOH solution, thereafter the mass is heated. At about 80° C. an exothermic reaction sets in. Then further 0.35 part by weight (calculated on the amount of the starting alloy) of a 5% by weight NaOH solution are added with stirring at such a rate that the temperature of the mixture remains at about 80 to 90° C., and the mixture always has a constant mass. In this operation NaOH may be replaced by KOH or another alkaline substance.

When the exothermic reaction ceases, i.e., when the temperature of the mass decreases, 4 parts by weight (calculated on the amount of the starting alloy) of a 30% by weight NaOH solution are added to the mixture and the mixture is heated at 100 to 110° C. for 30 minutes. Thereafter the alkaline solution is decanted and the obtained catalyst having spongy structure and excellent sedimenting properties is washed until neutral.

When more than one metal is to be dissolved from the starting powdery alloy, the leaching operation is carried out preferably in a way corresponding to the leaching of the component present in major proportion. I.e., if 45% by weight of aluminum and 5% by weight of silicon are to be dissolved, the leaching is preferably carried out as described for the leaching of aluminum.

The process of the present invention has the following main advantages over the known methods:

(a) Starting from alloys of the same composition, a far more active catalyst can be prepared with the process according to the invention than by the conventional methods. Using the process of the invention, a catalyst of the same activity as the conventional one can be prepared from alloys containing lower amounts of active components. Thus, the process according to the invention is also advantageous from an economic point of view, since in these catalysts the active components (e.g., nickel, cobalt, chromium, palladium, etc.) are the more expensive ones. This fact is confirmed also by the data listed in Table 1. Namely, from these data it will be seen that in some instances the activity of the catalysts increases by 200 to 300%. Taking into consideration that the activity data listed in the first column of Table 1 refer to the most active commercial Raney-metal catalysts which, in turn, are prepared by the most advantageous known methods, it can be stated that the method according to the invention provides an essential improvement in the preparation of catalysts.

(b) Using the method according to the invention, inactive components other than aluminum and having, in some respects, more advantageous properties than aluminum, may also be used in the preparation of Raney-catalysts. E.g., such metals can also be used which are less expensive than aluminum (e.g., silicon), or by the use of which less pyrophoric catalysts can be prepared (e.g., silicon, zinc, magnesium or the mixtures thereof). The use of such alloying elements in the preparation of Raney-catalysts was impeded up to now by the fact that catalysts of insufficient activity were obtained. The process according to the invention renders possible also the use of such alloying elements since, as proved by the data listed in Table 1, the activity of the obtained catalysts is in many instances far higher than that of the conventional Raney-nickel catalysts.

(c) Raney-catalysts prepared by the process according to the invention have excellent sedimention properties and thus they can easily be washed until neutral. It is known that this operation is the most laborious and time-consuming one in the conventional preparation of catalysts.

(d) In the leaching operation which follows the decomposition of the alloy, far less amounts of alkaline solvents are required than in the known processes. Accordingly, the leaching process can be carried out in vessels of smaller volume, and the reaction can be readily controlled since this step is hardly exothermic and only a minimum of foaming occurs.

The process according to the invention is further elucidated by the aid of the following non-limiting examples.

EXAMPLE 1

50 g. of a powdery alloy containing 50% by weight of nickel and 50% by weight of aluminum (grain size: smaller than 0.06 mm.) are mixed with 12 ml. of water, and 2 ml. of a 20% by weight NaOH solution are added dropwise to the mixture with stirring. Exothermic reaction sets in and the temperature of the mass rises to 95 to 100° C. Water is added to the mixture to replace the evaporated water at such a rate that the mixture always has a constant mass.

When the exothermic reaction ceases, i.e., when the temperature of the mass decreases, 200 ml. of a 25% by weight NaOH solution are poured onto the mass, and the aluminum hydroxide is leached by heating the mixture at 90 to 110° C. for one hour. Thereafter, the obtained catalyst is washed with distilled water until neutral. A catalyst having spongy structure and excellent sedimenting properties is obtained, the activity of which is far higher than that of the most active commercial one (see lines 1 to 4 of Table 2).

EXAMPLE 2

50 g. of a powdery alloy (grain size: smaller than 0.06 mm.) containing 45% by weight of nickel, 50% by weight of aluminum and 5% by weight of silicon are treated in the way as described in Example 1.

EXAMPLE 3

50 g. of a powdery alloy (grain size: smaller than 0.06 mm.) containing 50% by weight of nickel and 50% by weight of silicon are mixed at room temperature with 12 ml. of a 5% by weight NaOH solution. The obtained mass, which can easily be stirred, is heated to 80 to 90° C. During this operation water is added to the mixture to replace the evaporated water at such a rate that the mixture always has a constant mass.

After 10 to 15 minutes, 200 ml. of a 30% by weight NaOH solution are poured onto the mass and the mixture is heated at 100 to 110° C. for 30 minutes. The solution is decanted, 150 ml. of a fresh 30% by weight NaOH solution are added to the residue, and the mixture is heated at the same temperature for a further hour. In these latter steps the hydroxides are dissolved. Thereafter the obtained catalyst is washed until neutral. A catalyst of excellent sedimenting properties is obtained, the activity of which is far higher than that of the commercial one (see lines 5 to 8 of Table 2).

EXAMPLE 4

50 g. of a powdery alloy (grain size: smaller than 0.06 mm.) containing 43% by weight of nickel and 57% by weight of magnesium are mixed with 25 ml. of water. The obtained mass can easily be stirred. Exothermic reaction sets in and the temperature of the mass rises to 90 to 100° C. During this period water is added to the mixture to replace the evaporated water at such a rate that the mixture always has a constant mass.

When the exothermic reaction ceases, i.e., when the temperature of the mixture decreases, 250 ml. of a 40% by weight NaOH solution are poured onto the mass, and the obtained mixture is heated at 100 to 110° C. for 20 minutes. Thereafter the mixture is diluted with water to about ten-fold of its original volume, the solution containing the dissolved hydroxides is decanted, further 200 ml. of a 30% by weight NaOH solution are added to the residue, and the mixture is heated at 100 to 110° C. for 30 minutes. Thereafter the solution is decanted and the catalyst is washed until neutral. The obtained catalyst of excellent sedimenting properties has a far higher activity than the conventionally prepared one (see lines 9 to 12 of Table 2).

EXAMPLE 5

50 g. of a powdery alloy (grain size: smaller than 0.06 mm.) containing 35% by weight of nickel and 65% by weight of zinc are mixed with 9 ml. of a 5% by weight NaOH solution, thereafter the obtained mass is heated. At a temperature of about 80° C. an exothermic reaction sets in. At this time further 16 ml. of a 5% by weight NaOH solution are added to the mass with stirring at such a rate that the mixture always has a constant mass and the temperature remains between 80° C. and 90° C.

After about 15 minutes, 200 ml. of a 30% by weight NaOH solution are poured onto the mass, and the obtained mixture is heated at 100° C. to 110° C. for 30 minutes. Thereafter the alkaline solution is decanted, and the obtained catalyst of excellent sedimenting properties, having spongy structure, is washed until neutral. The activity of the thus-obtained catalyst is far higher than that of the conventionally prepared ones (see lines 13 to 16 of Table 2).

TABLE 2

| No. | Type of catalyst | Activity,[1] ml.H₂/minutes | | | | |
|---|---|---|---|---|---|---|
| | | Eugenol | Nitro-benzene | Benzyl-cyanide | Benzal-dehyde | Acetone |
| 1 | Prepared by conventional method [2] | 65 | 20 | 5 | 5 | 1 |
| 2 | Prepared according to the invention Ni/Al (Example 1) | 170 | 50 | 7 | 7 | 13 |
| 3 | Increased activity, percent [3] | 260 | 250 | 140 | 140 | 1,300 |
| 4 | do.[4] | 260 | 250 | 140 | 140 | 1,300 |
| 5 | Prepared by conventional method | 60 | 0 | | | |
| 6 | Prepared according to the invention Ni/Si (Example 3) | 130 | 40 | 10 | 16 | |
| 7 | Increased activity, percent [3] | 200 | 200 | 200 | 320 | |
| 8 | do.[4] | 215 | | | | |
| 9 | Prepared by conventional method | 80 | 25 | | | |
| 10 | Prepared according to the invention Ni/Mg (Example 4) | 210 | 35 | | | |
| 11 | Increased activity, percent [3] | 323 | 175 | | | |
| 12 | do.[4] | 263 | 140 | | | |
| 13 | Prepared by conventional method | 7 | 1 | 0 | 0 | 0 |
| 14 | Prepared according to the invention Ni/Zn (Example 5) | 50 | 2.5 | 0 | 0 | 0 |
| 15 | Increased activity, percent [3] | | | | | |
| 16 | do.[4] | 714 | 250 | | | |

[1] Conditions of activity measurement: 10 g. of substrate are treated with hydrogen in the presence of an amount of catalyst corresponding to 1.2 g. of nickel. The particle size of the different types of catalysts is the same. The reaction is carried out at atmospheric pressure at room temperature, in a rotary machine rotating with a speed of 150 to 160 r.p.m.

[2] The conventional method may be for example as disclosed by R. L. Augustin: Catalytic Hydrogenation, Dekker, New York, 1965, at pages 26 and 27, namely: 100 g. of powdery alloy are added to 400 ml. of 25% aqueous sodium hydroxide solution at room temperature, and the thus-formed suspension is heated for 1.5 hours at 90 to 95° C. The solution is decanted, then 400 ml. of fresh 25% aqueous sodium hydroxide solution are added to the residue, and the obtained suspension is heated for another hour. Therafter the alkaline solution is decanted, and the catalyst is washed uniti neutral. See also Degussa Merklblatt: Katalysatoren nach Raney, page 7; and R. Schroter: Neuere Methoden der praparativen organischen Chemie, Verlag Chemie, Berlin, 1943, page 80.

[3] Increase related to conventional Raney-nickel (50-50 Ni-Al alloy, see line 1) in the absorption of hydrogen, i.e., the ratios of lines 2 to 1, 6 to 1 and 10 to 1.

[4] Increase related to a catalyst prepared by conventional methods from the alloys of the same composition, i.e., the ratios of lines 2 to 1, 6 to 5, 10 to 9 and 14 to 13.

What we claim is:

1. A process for the preparation of highly active Raney-nickel-catalysts containing the active nickel in finely dispersed state, by leaching the inactive alkaline-soluble metal from the alloy, in which prior to the leaching operation the powdery alloy is mixed at a temperature of 20° C. to 150° C. with 0.1 to 1.8-fold amounts, calculated on the weight of the alloy, of water or an aqueous solution containing an alkaline agent selected from the group consisting of alkali metal and alkaline earth metal hydroxides and carbonates, ammonium hydroxide, ammonium carbonate and a mixture thereof, said agent being present in an amount of 0.001 to 0.8 times the stoichiometric quantity when a said aqueous solution is used instead of water, related to the amount of the metal to be leached, thereby to effect an exothermic reaction, and when said exothermic reaction is over, adding to the thus-obtained decomposed mass-like alloy the conventional alkaline agent used for leaching.

2. A process as claimed in claim 1, in which said temperature is 50° C. to 130° C.

3. A process as claimed in claim 1, in which the latter amount is 0.01 to 0.4 times.

References Cited

UNITED STATES PATENTS

| | | | |
|---|---|---|---|
| 2,257,800 | 10/1941 | Howk | 252—477 Q |
| 1,628,190 | 5/1927 | Raney | 252—477 Q |
| 1,915,473 | 6/1933 | Raney | 252—477 Q |

DANIEL E. WYMAN, Primary Examiner

W. J. SHINE, Assistant Examiner

U.S. Cl. X.R.

252—477 Q